Nov. 6, 1962 J. M. WILKINS 3,061,848
THREAD CUTTING DEVICE WITH SELECTIVELY POSITIONABLE DIE HOLDER
Filed Jan. 4, 1960
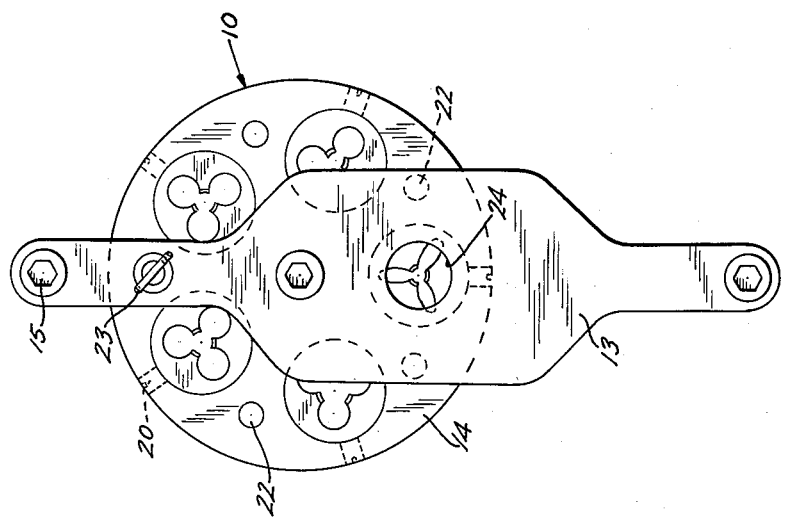
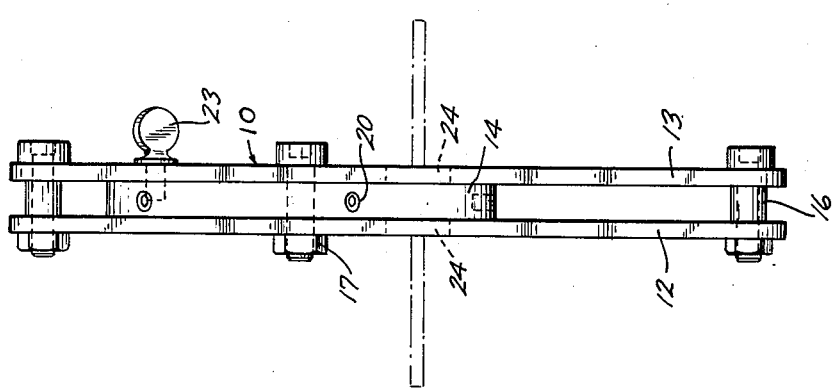
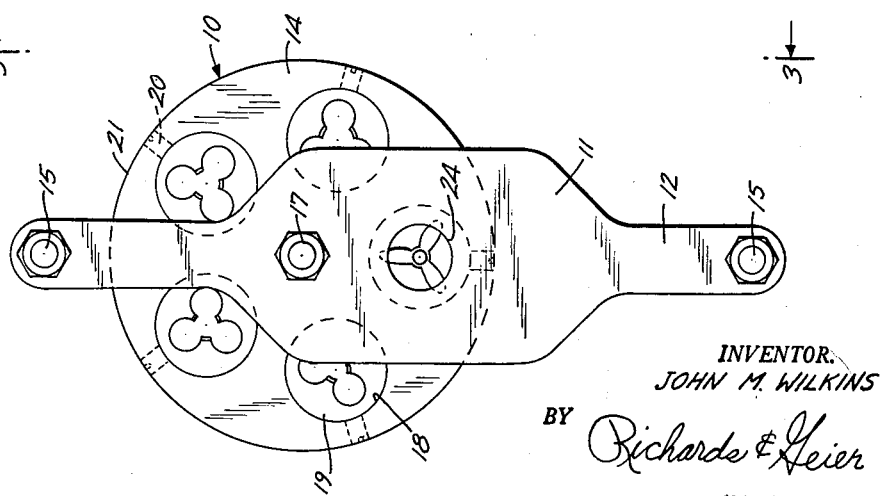
INVENTOR.
JOHN M. WILKINS
BY Richards & Geier
ATTORNEYS 3,061,848
THREAD CUTTING DEVICE WITH SELECTIVELY POSITIONABLE DIE HOLDER
John M. Wilkins, 25 Grove St., Poultney, Vt.
Filed Jan. 4, 1960, Ser. No. 370
1 Claim. (Cl. 10—115)

This invention relates to a thread cutting device, and refers more particularly, to a die holding device comprising an index screw plate containing a plurality of dies which may be used successively without the need for removing any of them from the holding device. Prior art die holders hold one die at a time and require that the die be removed from the holder before that same holder can be used to cut a different thread with another die. Thus in prior art, when it is necessary to successively cut threads of different sizes or classes requiring different dies, it is necessary to insert each die in the holder as it is needed and to remove each die from the holder before using the next die. The alternative to this is to have a separate holder for each die which is to be used. In either event, the prior art die holders are wasteful and inefficient both as regards time and monetary expenditures. It should also be noted that split dies are adjustable, and that they must be readjusted each time they are inserted in a holder. Some prior art die holders have attempted to hold more than one die; however, these die holders are cumbersome and difficult to use and are no more efficient than the prior art single die holders.

An object of the present invention is to provide a die holding device with which a number of different type threads may be cut without the necessity of inserting and removing dies, and without the necessity of having a plurality of die holders.

Another object of the present invention is to provide a screw plate containing a plurality of dies.

Another object is to provide a screw plate utilizing a plurality of dies which can be adjusted in the plate without the necessity of removing them.

Another object is to provide a screw plate wherein an entire die holding plate may be interchangeably inserted into the frame of the holding device without the necessity of removing or disturbing the dies.

Another object of the present invention is to provide a thread cutting device containing a plurality of dies which is easy and inexpensive to manufacture and which can be efficiently utilized.

Other objects of the present invention will become apparent in the course of the following specification.

The objects of the present invention may be realized through the provision of a thread cutting device comprising a holding frame and a die holding plate which is rotatably connected to the frame. The holding plate holds a plurality of dies which can be adjusted while inserted in the plate. By successively and selectively placing the dies in a selected position by rotating the holding plate, different classes and types of thread may be cut by the thread cutting device using only one holding frame and without the need of removing the dies from the holding plate.

The invention will appear more clearly from the following detailed description when taken in connection with the accompanying drawing showing, by way of example, a preferred embodiment of the inventive idea.

In the drawing:

FIGURE 1 is a front view of the thread cutting device of the present invention;

FIGURE 2 is a rear view of the thread cutting device of the present invention; and FIGURE 3 is a side view of the thread cutting device of the present invention taken along line 3—3 of FIG. 1.

A thread cutting device 10 of the present invention is shown in FIGURES 1 to 3, inclusive, and comprises a holding frame 11, comprising two elongated frame members 12, 13; and a circular index plate 14 disposed between frame members 12, 13, and removably and rotatably connected thereto. The frame members 12, 13 are parallel to one another and are kept at a selected distance from one another by bolts 15 and spacer blocks 16. The circular index plate 14 is rotatably connected to both frame members 12, 13 by means of shoulder bolt 17. The length of the spacer block 16 is slightly greater than the thickness of the index plate 14, so that the index plate 14 is free to rotate between the frame members 12, 13 with the shoulder bolt 17 as the center of rotation.

The index plate 14 has five openings 18 for receiving adjustable split dies 19. Die locking devices 20 connect the periphery 21 of the index plate 14 to the openings 18, so that the adjustable split dies 19 may not only be firmly secured in the index plate 14, but may also be adjusted so as to cut different class threads. Station locking holes 22 are provided in the rear surface of the index plate 14 so as to receive the thumb screw station lock 23. Frame members 12, 13 each have an index opening 24 so disposed that the dies 19 will each successively become aligned with openings 24 as the index plate 14 is revolved about shoulder bolt 17.

The operation and use of the thread cutting device 10 of the present inventiont is as follows:

The frame members 12, 13 are rigidly held together by bolts 15 (or similar means such as rivets or the like) and spacer blocks 16. With the index plate 14 either separated from or connected to the frame members 12, 13, dies 19 are inserted in the openings 18. It should be noted that the index plate 14 is easily removed from or inserted in its proper position between frame members 12, 13 by means of shoulder bolt 17. Next, the die locking device 20 is turned inwardly so as to lock the dies 19 in place. The dies 19 are adjustable split dies and may be of various types and classes. By rotating the die locking device 20 an even further amount the class of thread which will be cut by each die may be regulated. When it is desired to cut a thread, the particular die which corresponds to the desired thread is placed in alignment with index openings 24 by rotating the index plate 14. This may be done since openings 18 lie on a circle, the center of which is the center of rotation of plate 14, and the plate 14 is connected to the frame 11 in such a manner that the circle passes through the center line of openings 24. When the proper die is in alignment with openings 24, the thumb screw station lock 23 is tightened into the corresponding station locking hole 22. The station locking holes 22 are so disposed on the index plate 14 that when the thumb screw station lock 23 is properly seated therein, the proper alignment of the corresponding die with openings 24 is guaranteed. The selected die is then placed on the blank to be threaded and the threading is accomplished by rotating the frame members 12, 13 in a plane normal to the blank. The index plate 14 will rotate with the frame about the blank, since the thumb screw station lock 23 securely locks the index plate 14 to the frame 11. When the particular thread has been cut, and a different thread is desired to be cut, the thumb screw station lock 23 is loosened and the index plate 14 is rotated about shoulder bolt 17 until the next selected die is in alignment with the openings 24. The thumb station lock 23 is adjusted and seated in the appropriate station locking hole 22 and the thread may be cut. This process may be continued with any of the five dies in the particular index plate 14 without the need of removing, disturbing or readjusting any die and without the necessity of having a plurality of frames 11. If more than five types of threads are commonly cut in a particular shop a number of interchangeable index plates 14, each having a plurality of different dies may be utilized. The index plate 14 may be interchangeably inserted in the frame 11 by loosening thumb screw station lock 23 and shoulder bolt 17. This will in no way disturb the dies 19. Thus it can be seen that any number of adjustable split dies may be permanently adjusted to cut particular classes of threads so as to be always readily available for efficient use without requiring continuous readjustment, and requiring only one frame.

Among the advantages of the present invention are the following: a plurality of dies is readily available in one cutting instrument; one frame may be used to cut a plurality of different threads without removing a die from its holder; successive threads may be cut with the same instrument without moving, disturbing, adjusting or readjusting the dies; and the thread cutting device of the present invention is easy and inexpensive to manufacture and is efficient in use.

It is apparent that the described example is capable of many variations and modifications within the scope of the present invention. All such variations and modifications are to be included within the scope of the present invention.

What is claimed is:

A thread cutting device for cutting a thread on a blank, comprising a frame having two identically shaped parallel frame members, each of said frame members having a wide central portion and two opposed elongated narrow arm portions, means carried by said arm portions for rigidly interconnecting said frame members in spaced alined relation to each other, each of said frame members having an index opening adjacent to and spaced from its geometrical center, said index openings being in alignment; a plate disposed between said frame members, means carried by said frame members for removably and rotatably supporting said plate, said plate being rotatable about said center and having a plurality of openings uniformly spaced on a circle about said center, a plurality of dies each disposed in one of said plate openings, means carried by said plate for adjusting and locking each one of said dies in each of said plate openings, the circle on which said plate openings lie passing through the center of said frame index openings, whereby rotation of said plate with respect to said frame causes said dies to successively be brought into alignment with said index openings, said plate having station locking holes uniformly spaced on a circle about said center between said plate openings, and a station lock carried by one of said frame members and adapted to engage any one of said station locking holes for selectively locking said plate to said frame in a position wherein one of said dies is disposed in alignment with said index openings, whereby when said one die is disposed on a blank to be threaded said frame and said plate may be rotated by said arm portions as a unit about the center of the index openings for cutting threads in said blank.

References Cited in the file of this patent

UNITED STATES PATENTS

| 119,565 | Brown | Oct. 3, 1871 |
| 556,304 | Coats | Mar. 10, 1896 |
| 1,487,855 | Hasbrouck | Mar. 25, 1924 |

FOREIGN PATENTS

| 482,662 | Germany | Jan. 2, 1930 |